United States Patent
Huang et al.

(10) Patent No.: US 7,265,876 B2
(45) Date of Patent: Sep. 4, 2007

(54) PWM RENDERING FOR COLOR/GRAY-SCALE TEXT AND GRAPHICS FOR LASER PRINTER

(75) Inventors: Jincheng Huang, Mountain View, CA (US); Onur Guleryuz, Sunnyvale, CA (US); Anoop Bhattacharjya, Campbell, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 983 days.

(21) Appl. No.: 10/143,617

(22) Filed: May 9, 2002

(65) Prior Publication Data
US 2003/0210409 A1 Nov. 13, 2003

(51) Int. Cl.
H04N 1/405 (2006.01)
H04N 1/409 (2006.01)

(52) U.S. Cl. ..................... 358/3.2; 358/3.09
(58) Field of Classification Search .......... 358/3.2, 358/1.9, 3.09–3.12, 2.1; 382/237
See application file for complete search history.

(56) References Cited

U.S. PATENT DOCUMENTS

| | | | |
|---|---|---|---|
| 4,847,641 A | 7/1989 | Tung | |
| 5,249,242 A | 9/1993 | Hanson et al. | |
| 5,339,171 A | 8/1994 | Fujisawa et al. | |
| 5,818,971 A | 10/1998 | Moolenaar et al. | |
| 6,020,979 A | 2/2000 | Zeck et al. | |
| 6,052,203 A | 4/2000 | Suzuki et al. | |
| 6,072,588 A | 6/2000 | Dohnomae | |
| 6,137,918 A * | 10/2000 | Harrington et al. | 382/269 |
| 6,144,461 A | 11/2000 | Crean et al. | |
| 6,243,499 B1 | 6/2001 | Loce et al. | |
| 6,914,615 B2 | 7/2005 | Okada et al. | |
| 7,102,650 B2 | 9/2006 | Okada et al. | |
| 2003/0210409 A1 * | 11/2003 | Huang et al. | 358/1.1 |

FOREIGN PATENT DOCUMENTS

| | | |
|---|---|---|
| JP | 9186867 | 7/1997 |
| JP | 11331608 | 11/1999 |
| JP | 2002299788 | 10/2000 |
| JP | 200249366 | 2/2002 |

* cited by examiner

*Primary Examiner*—Thomas D. Lee
*Assistant Examiner*—Stephen Brinich
(74) *Attorney, Agent, or Firm*—Rosalio Haro

(57) ABSTRACT

The appearance of edges in an image is improved through precise placement of subpixels within pixel cells that are located on or near edges in an image. Image data is examined to identify a "target pixel" near the edge of an object that represents the object and is adjacent to a "background pixel" that represents only background. The target pixel may represent both the object and its background or it may represent the object only. A "second pixel", adjacent to the target pixel and representing the object, is also identified. The second pixel may represent both the object and its background or it may represent the object only. The target pixel's location with respect to the second pixel is analyzed to determine the placement of a subpixel within the target pixel cell and the placement of a subpixel within the second pixel cell, such that the edge of the object is well-defined and the density of the object is preserved. A vertical smoothing process can additionally be performed to improve further the appearance of edges in the image. The technique is particularly advantageous for printing a halftoned object represented by pixels that are not saturated.

24 Claims, 17 Drawing Sheets

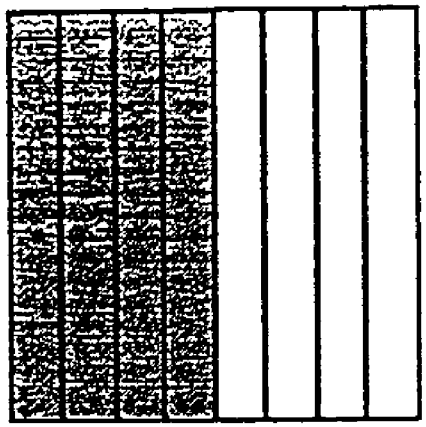
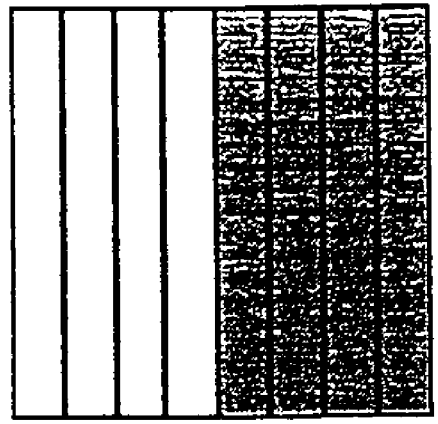
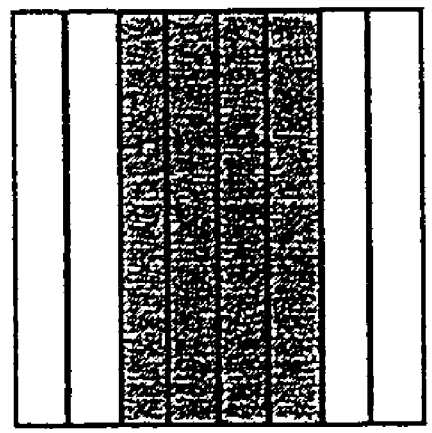
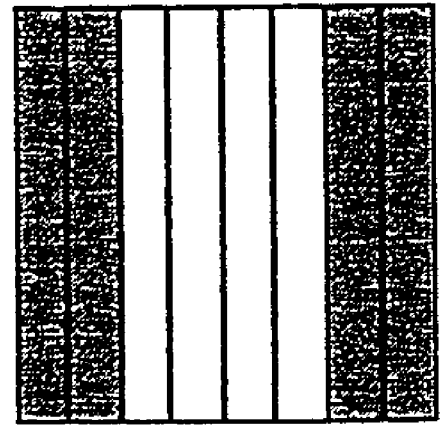
Fig. 6

PWM RENDERING FOR COLOR/GRAY-SCALE TEXT AND GRAPHICS FOR LASER PRINTER

TECHNICAL FIELD

The invention relates to the processing of image data for the purpose of enhancing the appearance of an image as printed by a printing device such as a laser printer.

BACKGROUND ART

A toner-transfer printing device such as a laser printer creates a printed image by printing an array of picture elements, referred to as pixels, on the print medium. Any image, whether text or graphics, to be printed by the printing device is represented in the form of a set of discrete pixels. Images such as photographs are, however, continuous analog representations of objects in the real world. Other types of images, including text and computer graphics images, may also contain representations of analog forms. In all cases, it is necessary to represent the desired image with discrete pixels if the image is to be printed by a toner-transfer printing device.

One common representation is a raster or orthogonal grid of pixels. A rasterized image typically contains a large number of discrete pixels, each of which has dimensions such as location coordinates and intensity. The area of the image represented by a pixel is referred to as a pixel cell. The intensity dimension for black and white images is a value indicating a shade of gray. The intensity dimension for a color image is a set of values indicating levels for a set of colors such as cyan, magenta, yellow and black. This pixel feature for both black and white as well as color images will hereinafter be referred to as the pixel's "gray level".

A rasterized representation of an original image can visibly distort the image when the spatial frequency of the raster is less than the highest discernable frequencies present in the image. Straight lines, sharp edges and corners and other high contrast features contain very high frequencies and often cannot be rendered accurately. If a high-frequency feature such as a sharp edge is rendered with a pixel resolution that is insufficient to capture all of the visible information contained within the image, artifacts will appear. This phenomenon is known as aliasing. Certain visual artifacts are particularly problematic: diagonal lines and boundaries between different regions tend to have a jagged step or staircase appearance that is often quite visible. The appearance of jagged edges and other artifacts in digitized images is a significant problem that is encountered when using a toner-transfer printing device for printing.

Jagged edges and certain other forms of image distortion can be addressed through a process called antialiasing, which involves smoothing or blurring the edges of high-contrast lines and curves. Antialiasing may be accomplished in a variety of ways. The result is an adjustment to the gray level of selected pixels to achieve a blurred effect: diagonal lines that otherwise would appear with jagged edges will have a blurred but smoother appearance.

Subsequent to an antialiasing operation, a toner-transfer printing device creates a printed image based on the adjusted pixel values by using continuous tone or halftone formats as appropriate to reproduce the image on the print medium. Although printing devices can selectively use continuous tone or halftone formats to generate each pixel on the print medium, current printing devices require a trade-off between the presence of artifacts and the presence of blurred edges. Although antialiasing techniques can enhance the perceived quality of an image, the blurred edges of an antialiased object fail to depict accurately the sharp features in the original image.

To print an image, a typical toner-transfer printing device creates an electrostatic representation of the pixels on a photoreceptive surface. In a typical laser printer, for example, a rotating drum with a photosensitive surface serves as the photoreceptive surface. Prior to forming a given printed image, the drum is cleaned and a uniform negative charge is applied to the drum's surface. The printing apparatus focuses laser light on selected portions of the drum's surface to create an electrostatic representation of the pixels. The laser light discharges the drum surface in the exposed regions. Portions of the drum surface that are not exposed to the laser light retain a negative potential, but the exposed portions have a higher potential. This process produces an electrostatic image on the drum's surface that is ready to be developed and transferred as a visible image to the print media.

To develop the electrostatic image into a visible image, developing material called toner is placed on the drum surface according to the electrostatic charge. Prior to being deposited on the drum's surface, the toner particles are given a negative charge; consequently, the toner particles are attracted to the areas of the drum surface that have acquired a higher potential through exposure to the laser light, and are repelled from the surface areas not exposed.

The next step is to transfer the toner from the drum to a print medium such as paper. A positive charge is applied to the back surface of the paper such that when the paper contacts the drum surface, the positive charges pull the negatively charged toner particles off the surface of the drum. The toner is fused to the paper by heat and pressure to produce a printed image.

The resolving power of a toner-transfer printing device is related to the granularity of the laser mechanism used to expose portions of the drum surface. A typical toner transfer device is capable of modulating the laser to expose an area significantly smaller than one pixel cell and thereby produce a discharged spot on the drum that is smaller than one pixel.

A technique referred to as pulse width modulation utilizes the high-resolution capability of toner-transfer printing devices to control the appearance of pixels. According to this technique, a printing device deposits toner only in a designated portion of a pixel by modulating the duration of the laser pulse used to expose a given pixel. The pulse-width modulation technique divides a pixel into a number of sub-elements and directs the printing device to expose only a specified number of sub-elements within a pixel, for example, several sub-elements on the left side of the pixel. A portion of a pixel created in this manner will hereinafter be referred to as a subpixel. By controlling the width of subpixels that are exposed to the laser light, the printing device can control the quantity of toner particles that adhere to the drum surface within each pixel cell.

Known halftoning techniques assign to a selected pixel a value representing a subpixel of a specified width. The width of the subpixel is commonly determined according to a number of parameters including the pixel's gray level. Known techniques, however, produce artifacts such as patterns of uneven subpixels along edges of an object. For purposes of this discussion, the term "object" means any distinct entity depicted in an image including text characters.

"Background" means a portion of the image against which the object is displayed.

An additional problem associated with known pulse-width modulation techniques arises due to the printing device's use of electric charges during the printing process. As discussed above, toner particles are attracted to the areas of the photoreceptive material that have been exposed to laser light. Ordinarily, the quantity of toner particles attracted to an area of the material that corresponds to a pixel cell will be largely a function of the pixel's gray level; however, this electrostatic process can fail for an isolated subpixel that is surrounded by contrasting background pixels when the charge for the isolated subpixel is too weak to attract any toner particles. As a result, the printer fails to print the isolated subpixel. This phenomenon can be problematic when printing objects such as text. Under certain circumstances, known image processing techniques can cause subpixels at an edge of a halftoned object to be isolated from the pixels within the object. If the printing device fails to print the isolated subpixels, the object loses density and the object's appearance is degraded.

The problems outlined above relating to edge rendition and isolated subpixels can be especially severe for halftoned objects where a substantial portion of an object is represented by pixels that are not saturated. For purposes of this discussion, a pixel is saturated if it is represented by a subpixel that completely fills the area of the pixel cell. A pixel is not saturated if it is represented by a subpixel having a width that is less than the full width of the pixel cell.

DISCLOSURE OF INVENTION

It is an object of the present invention to provide a technique for achieving improved edge rendition in toner-transfer printers. The invention provides enhanced edge rendition through precise placement of subpixels within pixel cells that are located on or near edges in an image. Image data is examined to identify a "target pixel" near the edge of an object that represents the object and is adjacent to a "background pixel" that represents only background. A "second pixel", adjacent to the target pixel and representing the object, is also identified. The invention analyzes the target pixel's location with respect to the second pixel to determine the placement of a subpixel within the target pixel cell and the placement of a subpixel within the second pixel cell such that the edge of the object is well-defined and the density of the object is preserved. A vertical smoothing process can additionally be performed to improve further the appearance of edges in the image. This technique is particularly advantageous for printing a halftoned object represented by pixels that are not saturated.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 6 shows several subpixel patterns that can be produced using pulse width modulation techniques.

FIG. 12 is a block diagram of a system that may be used to carry out various aspects of the invention.

MODES FOR CARRYING OUT THE INVENTION

System Overview

Figure 1:
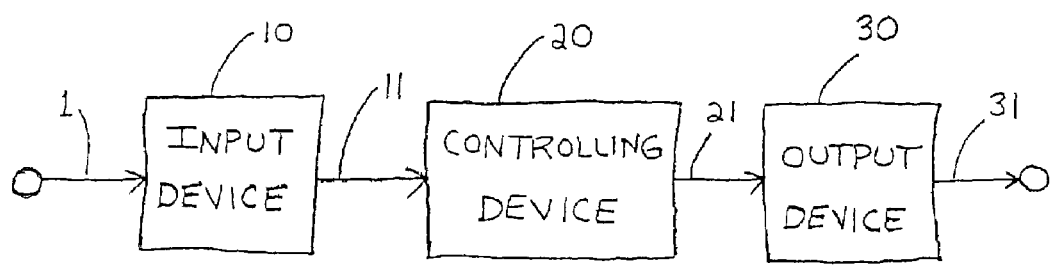
FIG. 1 illustrates major components in a typical color image reproduction system.

FIG. 1 illustrates major components in a typical image reproduction system. Input device 10 receives from path 1 signals representing an original image and generates along path 11 a rasterized representation of the original image. Controlling device 20 receives this representation from path 11 and, in response, generates along path 21 an output-device-dependent representation of the original image. Output device 30 receives this representation from path 21 and, in response, generates along path 31 a printed representation of the original image. The present invention is directed toward improving the perceived quality of the printed representation produced by the output device.

Input device 10 may be a software application capable of generating text or graphics images or, alternatively, may be an apparatus such as a scanner or camera. If input device 10 is a software application for creating images, the signals received from path 1 could represent commands or data for the application.

Output device 30 may be any type of toner-transfer printer. If output device 30 is a laser printer, for example, the printed image generated along path 31 could be the printed image on paper.

Figure 2:
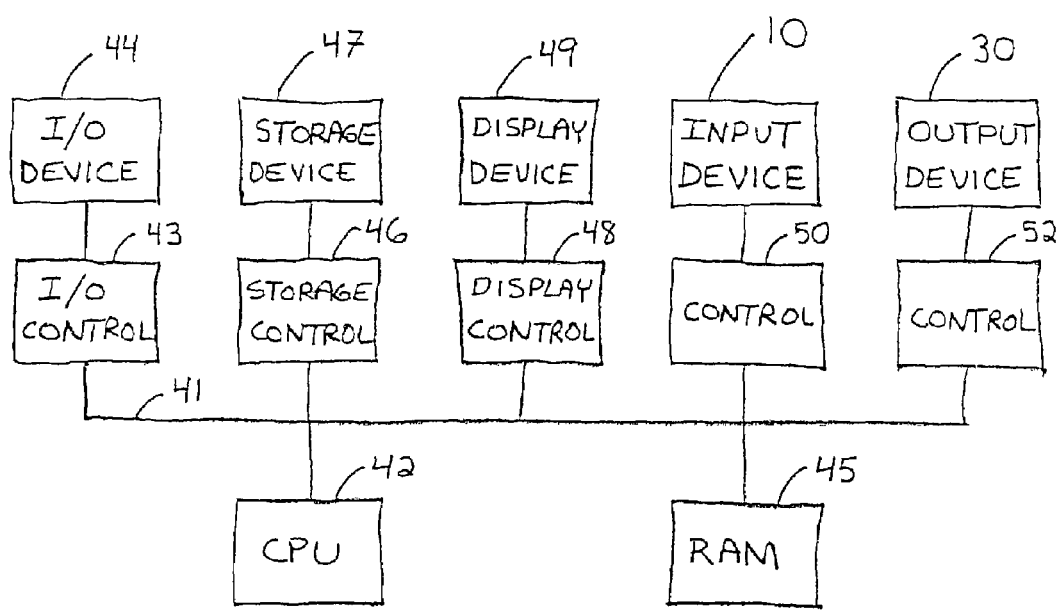
FIG. 2 illustrates major components in one typical personal computer system that may be used to carry out various aspects of the invention.

Controlling device 20 is responsible for transforming the rasterized representation of the original image received from path 11 into an output-device-dependent representation of the original image. Controlling device 20 may be implemented by software and/or hardware in a general purpose computer such as that illustrated in FIG. 2. FIG. 2 illustrates major components in a typical personal computer system that may be used to carry out various aspects of the invention. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include programs that implement various aspects of the present invention. Display control 48 provides an interface to display device 49. Control 50 represents an interface to input device 10 such as a software application capable of generating text or graphics images, or a scanner. Control 52 represents an interface to output device 30 such as a laser printer.

In FIG. 2, all major system components connect to bus 41, which may represent more than one physical bus. For example, some personal computers incorporate only a so-called Industry Standard Architecture (ISA) bus. Other computers incorporate an ISA bus as well as other buses conforming to other standards such as the PCI standard. A bus architecture is not required to practice the present invention.

The functions of one or more computer components as well as various aspects of the present invention can be implemented in a wide variety of circuitry including discrete logic components, one or more ASICs and/or program-controlled processors. For example, controlling device 20 may be implemented by a special-purpose device. The manner in which controlling device 20 is implemented is not important to the present invention. Other implementations including digital and analog processing circuitry may be used.

Antialiasing

Figure 3:
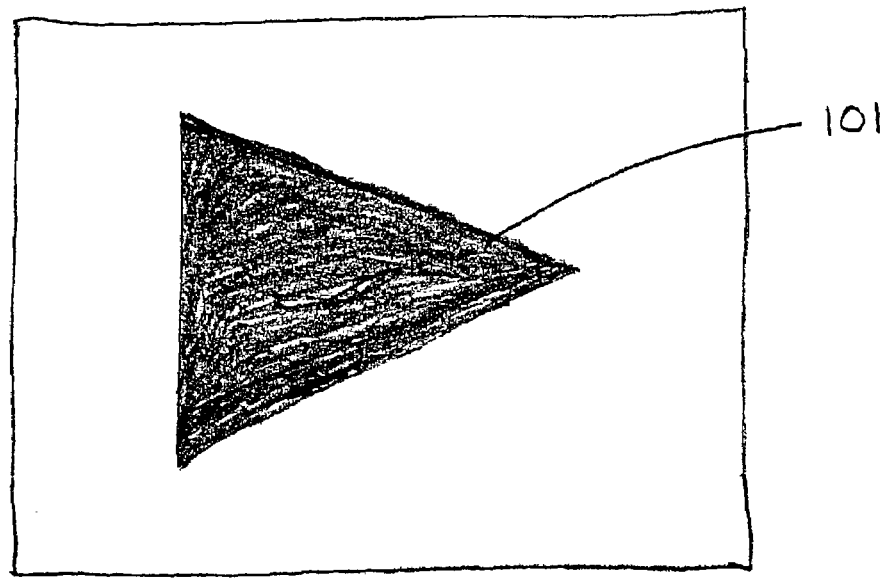
FIG. 3 illustrates an object in an image.
Figure 4:
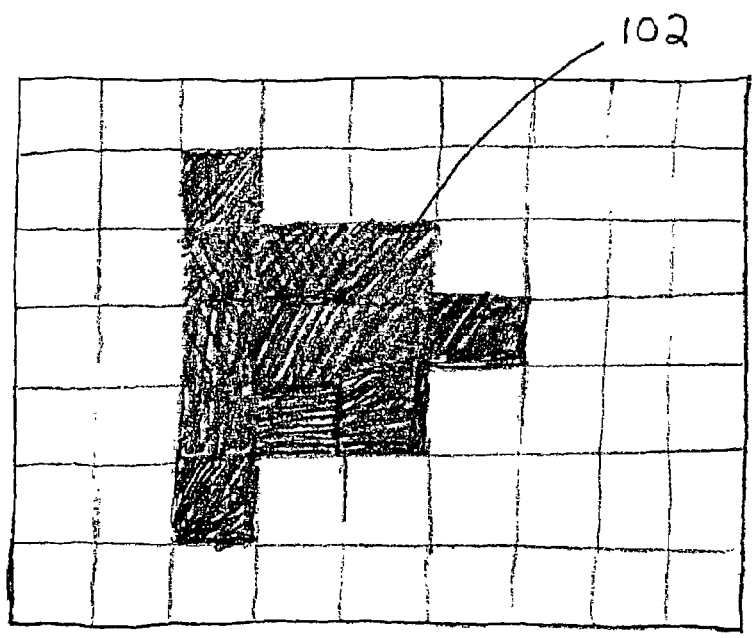
FIG. 4 shows a rasterized representation of the object in FIG. 3.

As discussed above, if the pixel resolution of a rasterized image is insufficient to capture the highest discernable frequencies present in the original image, artifacts may appear in the form of jagged edges, diagonal lines and boundaries between different regions. FIG. 3 illustrates an object 101 in an image. FIG. 4 shows a rasterized representation 102 of the object 101 in FIG. 3. Jagged edges are present along the edges of the rasterized representation 102 of the object in FIG. 4.

Figure 5:
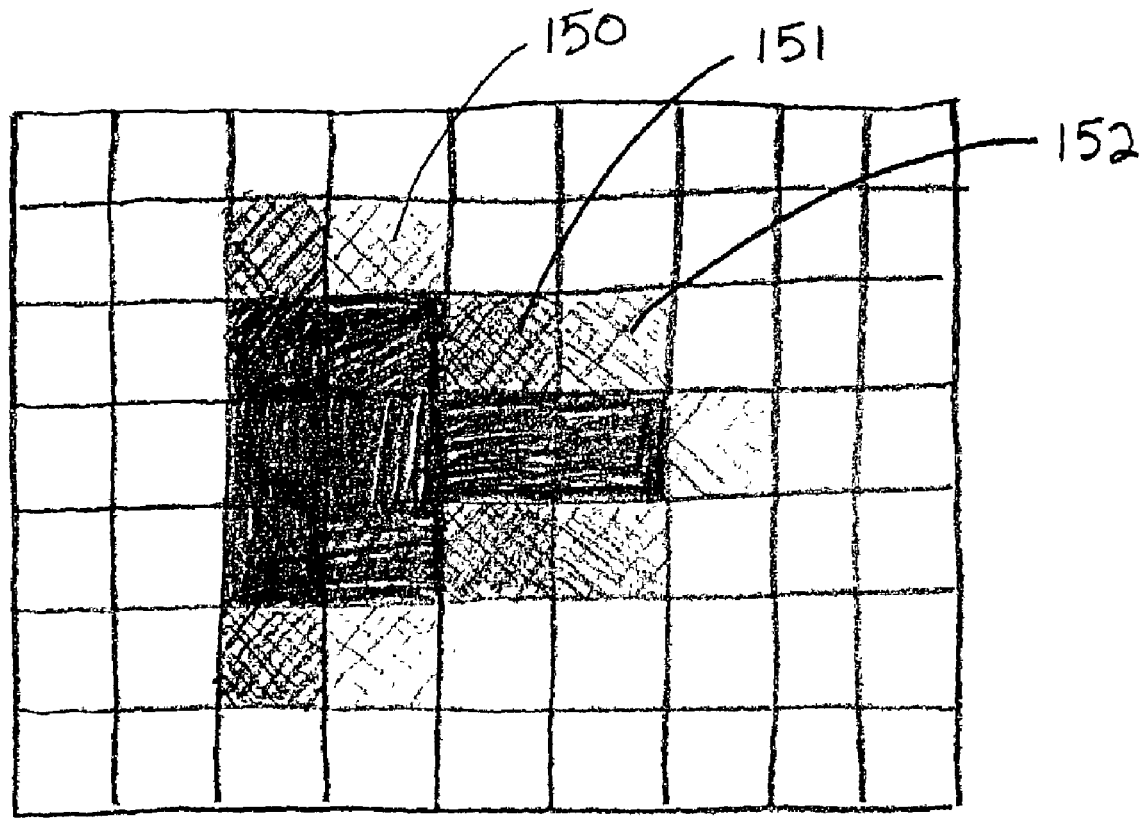
FIG. 5 is a schematic illustration of the object in FIG. 4 after antialiasing.

Jagged edges and other forms of image distortion can be addressed through antialiasing techniques. Antialiasing involves smoothing or blurring the edges of high contrast lines and curves. FIG. 5 is a schematic representation of the object in FIG. 4 after antialiasing. In FIG. 5, pixels 150, 151, 152 near the top edge of the object have been assigned intermediate gray level values to produce a blurred appearance. The blurred edges mitigate the stairstep appearance of the jagged edges, but fail to depict accurately the edge in the original image.

Another approach used to control the appearance of pixels is to utilize pulse width modulation techniques. Pulse-width modulation techniques divide a pixel cell into a number of subpixels and direct the printing device to expose a specified number of subpixels. FIG. 6 shows several subpixel patterns that can be produced using pulse width modulation techniques. Many halftoning techniques assign to a selected pixel a value representing a subpixel of a specified width. Known techniques, however, produce artifacts such as patterns of uneven subpixels along edges of an object.

Figure 7:
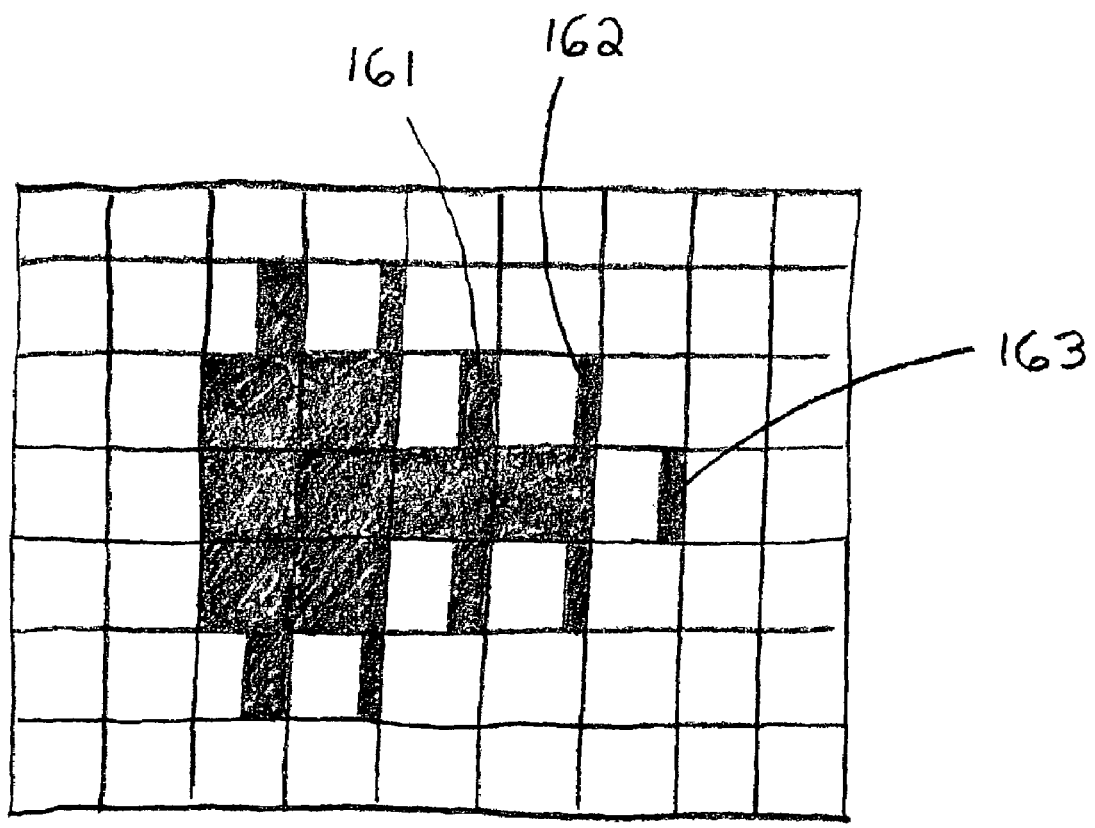
FIG. 7 is a schematic illustration of a set of subpixels representing the antialiased object in FIG. 5.

An additional problem associated with known pulse-width modulation techniques arises due to the printing device's use of electromagnetic charges during the printing process. In some cases, the charge within the electrostatic image corresponding to a small, isolated subpixel is too weak to attract any toner particles. As a result, the printer fails to print the isolated subpixel. FIG. 7 is a schematic illustration of a set of subpixels representing the antialiased object of FIG. 5. Several subpixels 161, 162 and 163 are located on the top-right of the object. Subpixel 163 is isolated from the rest of the object. Under certain conditions a printer may fail to print an isolated subpixel. The problems outlined above relating to edge rendition and isolated subpixels can be especially severe for halftoned objects where a substantial portion of an object is represented by pixels that are not saturated.

The present invention provides a technique for achieving improved edge rendition in toner-transfer printers. The invention provides enhanced edge rendition through precise placement of subpixels within pixel cells that are located on or near edges in an image.

Identification of Target Pixels and Second Pixels

Accordingly, the present invention examines image data to identify a "target pixel" near the edge of an object that represents the object and is adjacent to a "background pixel" that represents only background. The target pixel may represent both the object and its background or it may represents the object only. A "second pixel", adjacent to the target pixel and representing the object, is also identified. The second pixel may represent both the object and its background or it may represent the object only. The invention analyzes the target pixel's location with respect to the second pixel to determine the placement of a subpixel within the target pixel cell and the placement of a subpixel within the second pixel cell such that the edge of the object is well-defined and the density of the object is preserved. This process of subpixel position determination, described in detail below, is performed with respect to the target pixel and second pixel only. The background pixel remains unchanged. This technique is particularly advantageous for printing a halftoned object represented by pixels that are not saturated.

Rendition Values

The present invention requires two sets of data for a given image: halftone data representing pixel intensity or gray level and rendition values for each pixel in the image. A rendition value expresses the degree to which a pixel represents an object. A pixel can have a rendition value indicating that it represents an object only, background only, or some mixture of both object and background. Rendition values can be generated in a variety of ways; a preferred implementation of the invention generates the rendition values in conjunction with an antialiasing operation. In this preferred implementation, an antialiasing process is applied to the image data to blur the edges in the image. A pixel in the antialiased data that has a gray level changed by antialiasing (indicating that the pixel is located near an edge of an object) is assigned a rendition value between 0 and 1. A pixel with a gray level that has not been changed by antialiasing is assigned a rendition value of 0 if it represents only background or 1 if it represents only an object.

Figure 8:
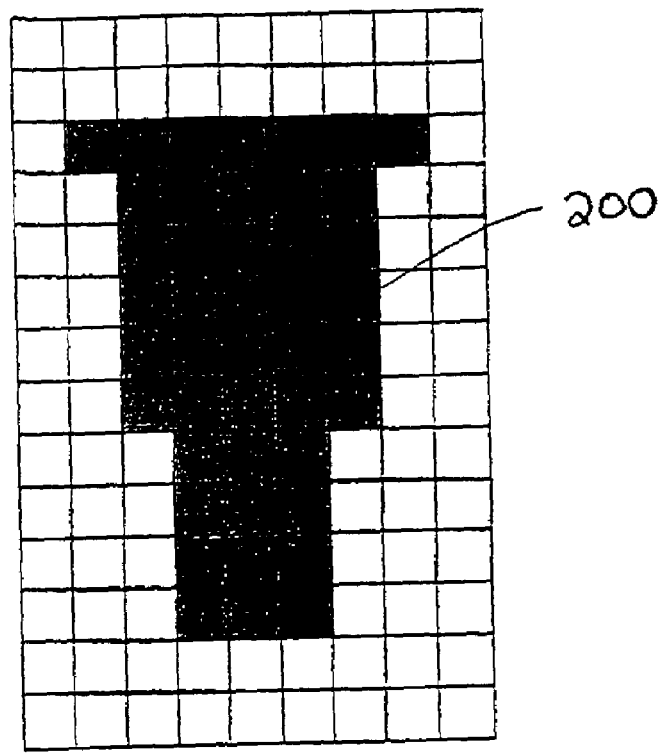
FIG. 8 shows a rasterized representation of an object in an image.
Figure 9:
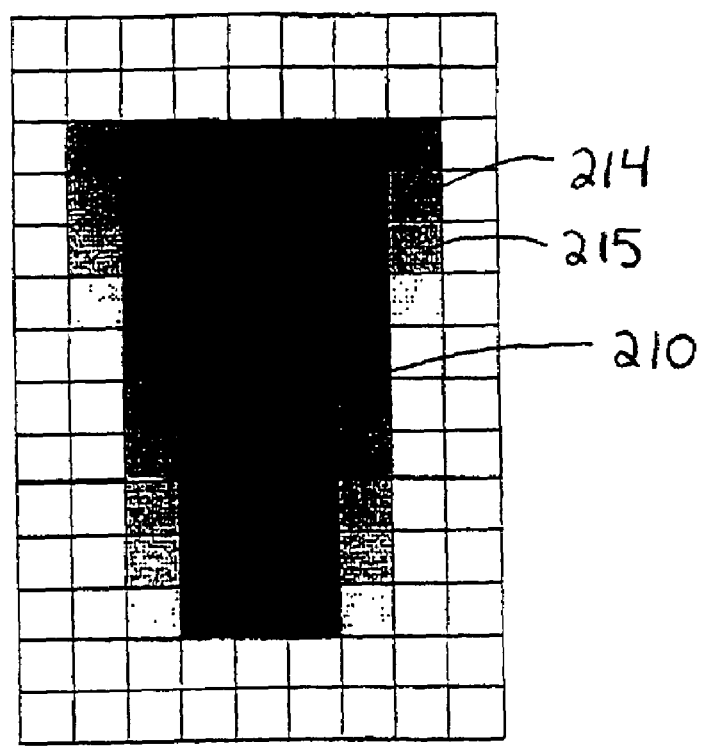
FIG. 9 is a rasterized representation of the image in FIG. 8 after it has undergone an antialiasing operation.

FIG. 8 shows a rasterized representation of an image containing an object 200. FIG. 9 is a schematic rasterized representation of the image in FIG. 8 after it has undergone an antialiasing operation. Pixels 214 and 215 are located near an edge of the antialiased object 210 and have received modified gray level values in the antialiasing process. In the preferred implementation described above, pixels located along the edge of object 210, which include pixels 214 and 215, are modified by the antialiasing operation and are assigned corresponding rendition values between 0 and 1.

Figures 10, 11:
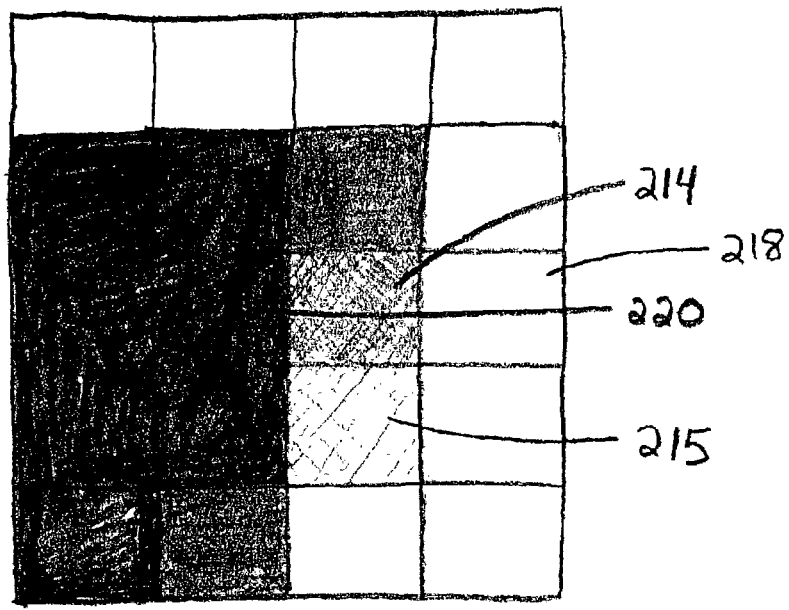
FIG. 10 is a schematic representation of a group of pixels located near an edge of the object in FIG. 9 that have received modified values in an antialiasing operation.
FIG. 11 shows a hypothetical set of rendition values for the pixels identified in FIG. 10.

FIG. 10 is a schematic representation of a group of pixels located near an edge of object 210 that has undergone antialiasing. A group of pixels including pixels 214 and 215 have received modified gray level values in the antialiasing operation. FIG. 11 shows a hypothetical set of rendition values for the pixels shown in FIG. 10. In this example, a target pixel 214 represents both object and background and has a rendition value equal to 0.4. A background pixel 218 adjacent to the target pixel 214 represents only background and has a rendition value of 0.0. A second pixel 220 adjacent to the target pixel 214 represents only the object 210 and has a rendition value equal to 1.0.

The schematic representations of objects shown in the figures discussed thus far, including object 210 shown in FIG. 9, all illustrate black objects in front of white backgrounds. These representations have been used merely to simplify the illustrations. The principles discussed herein also apply to images with objects and backgrounds having intermediate gray levels.

These simplified examples may contribute to some confusion about the rendition values. In certain implementations, the rendition values for pixels representing black objects in front of white backgrounds may have values that correspond closely to pixel intensity values. It may be helpful to point out the fact that the rendition value does not represent pixel intensity or gray level. For example, the rendition value 1.0 for pixel 220 indicates that the entire area for this pixel cell represents an object only. The gray level or intensity value for a pixel is a separate value that is established according to the color or gray level of the object and/or background that the pixel represents.

Subpixel Width and Location

As discussed above, the invention determines the placement of a subpixel within the target pixel cell and the placement of a subpixel within the second pixel cell such that the edge of the object is well-defined. Each pixel is represented by a value representing the subpixel's position within the pixel cell and another value representing the subpixel's width. For purposes of this discussion, a "subpixel position value" represents the position of a subpixel within a pixel cell, and a "subpixel width value" represents the width of a subpixel. According to the invention, the rendition of edges is improved by precise determination of subpixel position values for target pixels and second pixels.

Serial Implementation

The invention can be carried out by a variety of system configurations. FIG. 12 is a block diagram of a system that may be used to carry out various aspects of the invention. According to this implementation, a Resolution Improvement Technology ("RIT") processor 610 and a halftone processor 620 operate in series. The RIT processor receives rasterized image data 605 from path 601. The rasterized image data 605 can be essentially any representation of image data including RGB or CMYK data or black and white image data. In CMYK data, pixels in an image are represented by values representing cyan (C), magenta (M), yellow (Y) and black (K) components. In RGB data, pixels are represented by values representing red (R), green (G) and blue (B) components.

The RIT processor 610 performs an antialiasing operation to smooth the edges contained in the rasterized image data 605, generating antialiased data 606 along path 602. The antialiasing operation can be performed by means of any one of a number of known antialiasing algorithms. A preferred implementation of the invention utilizes the process described in the U.S. Patent Application entitled "Fast Text/Graphics Resolution Improvement with Chain-Code Table Look-Up" by Onur G. Guleryuz and Anoop K. Bhattacharjya, filed on Jan. 14, 2002 having "Express Mail" Label Number: EV001654123US, incorporated herein by reference in its entirety. According to the method described in this patent application, the boundary of each object is traced, parameterized and smoothed. The RIT processor 610 additionally calculates for each pixel in the rasterized image data 605 a rendition value. Rendition value data 608 is generated along path 602.

The halftone processor 620 processes the antialiased data 606 to produce for each pixel in the image data a halftoned intensity value representing the pixel's gray level. Halftone data 607 is generated and transmitted with the rendition value data 608 along path 603.

A Boundary Smoothing and Position Adjustment (BSPA) processor 630 examines the halftoned intensity values and the rendition values to identify the target pixels, adjacent background pixels and adjacent second pixels, and modifies the placement of subpixels within the target and second pixels by a process of subpixel position determination described in detail below. The results of this process are passed along path 604.

Subpixel Position Determination

The subpixel position determination process determines subpixel position values for both the target pixel and the second pixel according to the target pixel's location with respect to the second pixel. The background pixel adjacent to the target pixel remains unchanged. In a preferred implementation of the invention, the determination is performed in the following manner. If the target pixel is located to the left of the second pixel, then (1) a subpixel is positioned on the right side of the target pixel and (2) a subpixel is positioned on the left side of the second pixel. If the target pixel is located to the right of the second pixel, then (1) a subpixel is positioned on the left side of the target pixel and (2) a subpixel is positioned on the right side of the second pixel. The result of this determination is to place the subpixels within the target pixel and the second pixel together in contiguous fashion to create a well-defined edge in a printed representation of an image. Preferably, if no second pixel has been identified because the target pixel is bordered on the right side and on the left side by pixels representing background only, a subpixel is placed in the center of the target pixel.

Figure 13:
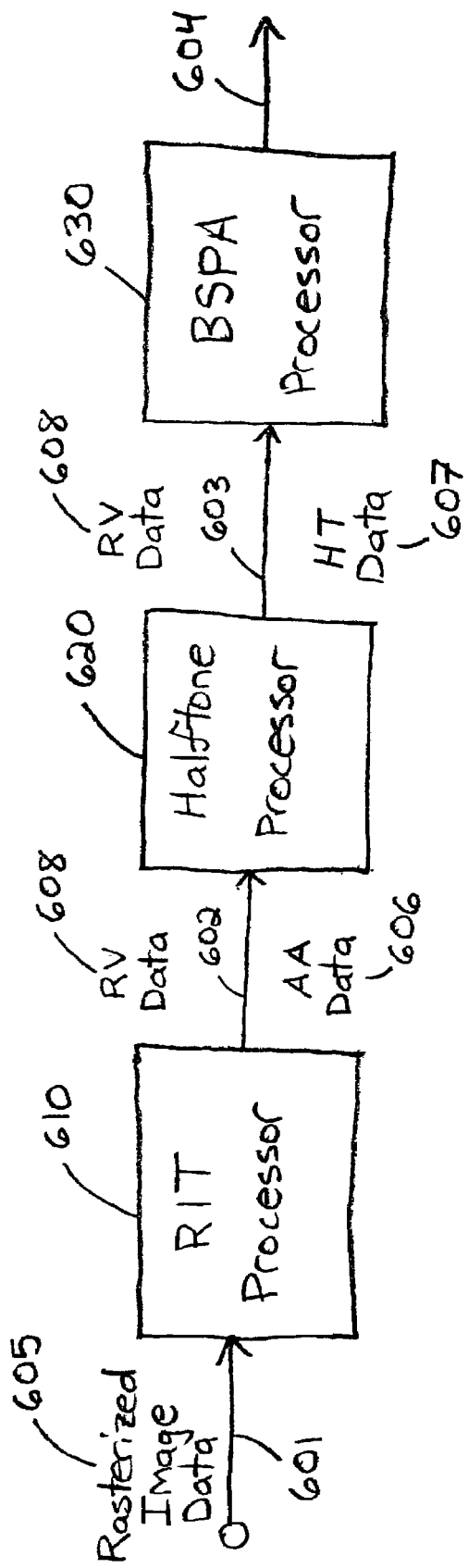
FIG. 13 shows a subpixel placed within a target pixel and a subpixel placed within an adjacent second pixel.
Figure 13:
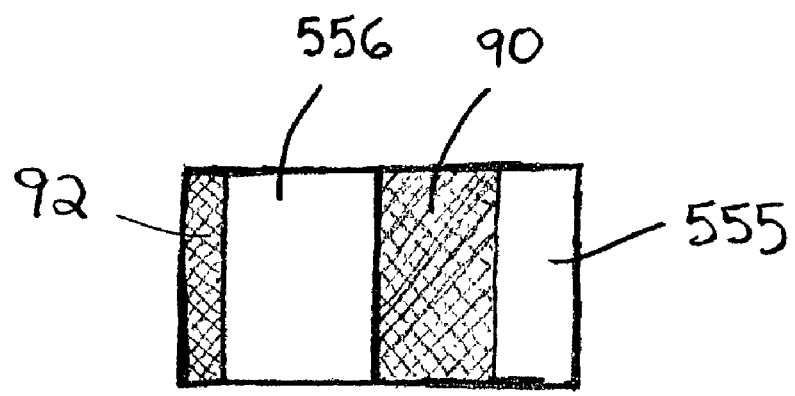
Figure 14:
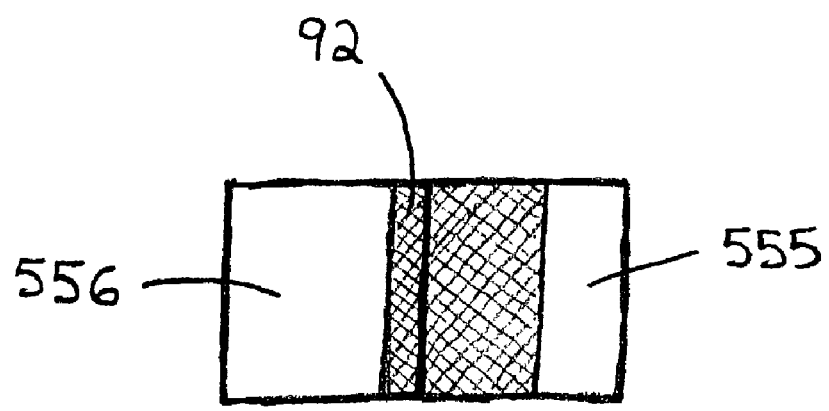
FIG. 14 shows the target pixel and the second pixel in FIG. 13 after subpixel position determination has been performed.

FIG. 13 shows a target pixel 556 located to the left of a second, adjacent pixel 555. In FIG. 13, a subpixel 90 is located on the left side of the second pixel 555. A subpixel 92 has been placed on the left side of the target pixel 556. FIG. 14 shows the target pixel 556 and the second pixel 555 of FIG. 13 after subpixel position determination. The subpixel 92 in the target pixel 556 has been placed on the right side of the target pixel 556 to produce a well-defined edge. All pixels in the rasterized image data are examined and the subpixel position determination process is repeated for each target and second pixel.

In this implementation of the invention, subpixel position values for all pixels are determined from the halftone data 607. Subpixel width values for all pixels in the image, including target and second pixels, are generated from halftoned intensity values.

Figure 15A:
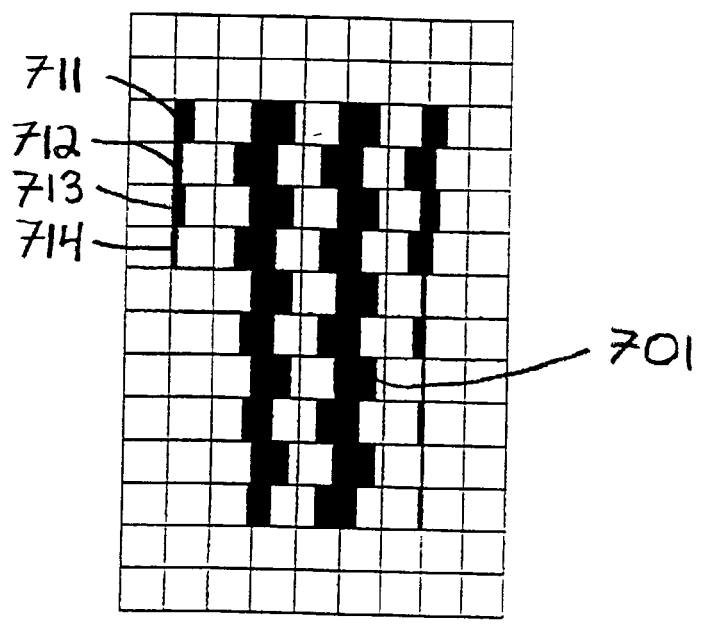
FIGS. 15A and 15B show schematic representations of an object after antialiasing and halftoning that demonstrate the effects of subpixel position adjustment.
Figure 15B:
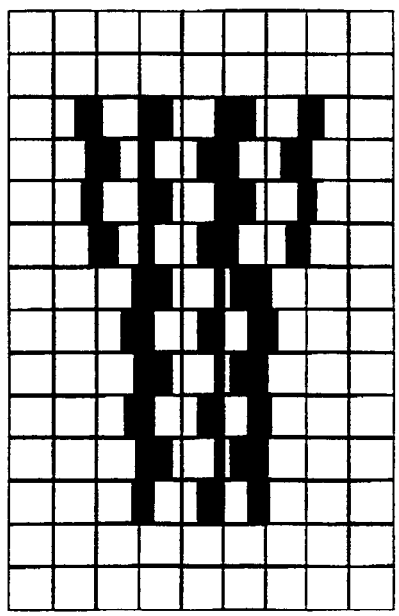

In an alternative implementation of the invention, initial subpixel width and position values are generated for all pixels in the image based on the halftone data 607. FIG. 15A shows a schematic representation of an object 701 represented by non-saturated pixels after antialiasing and halftoning. In FIG. 15A, the output of the halftone processor 620 contains isolated subpixels at the boundary of the object 701 including subpixels 711–714. To obtain improved edge rendition, the BSPA processor 630 identifies target pixels and second pixels and modifies subpixel position values of the target and second pixels using the subpixel position determination process described above. FIG. 15B shows a schematic representation of the subpixel positions that result from this process.

Vertical Smoothing

In a preferred implementation, the BSPA processor 630 subsequently smooths the vertical edges of objects in the image data. This is done by identifying and adjusting the values of "subject pixels" located on a vertical boundary between an object and its background. A pixel that represents the object and is adjacent to a background pixel that represents only background is identified as a subject pixel. The subject pixel may represent both the object and its background or it may represent the object only. The BSPA processor smooths vertical boundaries of an object by adjusting the values of the subject pixels as explained below.

Figure 16:
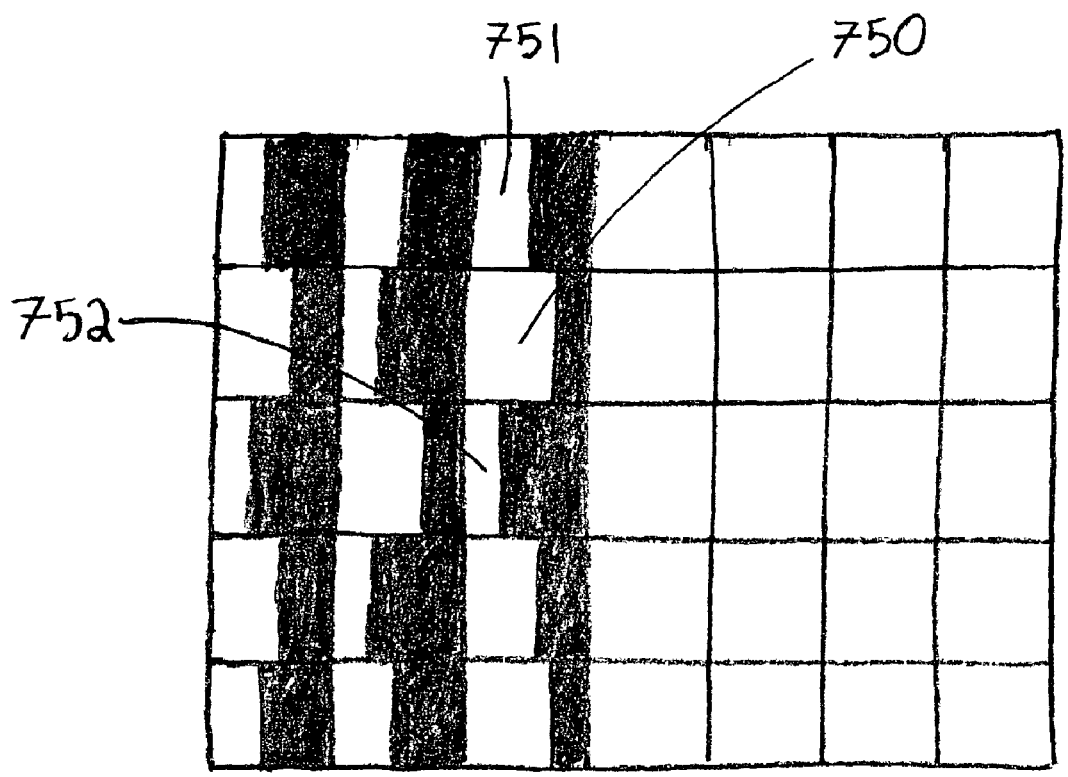
FIG. 16 shows a schematic representation of a group of pixels located on or near a vertical boundary between an object and its background.

FIG. 16 shows a schematic representation of a group of pixels located on or near a vertical boundary between an object and its background. Subject pixels 750, 751 and 752 are located on a vertical boundary of an object. In a preferred implementation of the invention, the BSPA processor 630 adjusts the subpixel width value of each subject pixel according to the subpixel width value of that respective pixel and the subpixel width values of two neighboring pixels situated directly above and below the subject pixel. The subpixel width values are adjusted in the following manner. Referring to FIG. 16 as an example, let $W(x,y)$ denote the subpixel width value of subject pixel 750, let $W(x,y-1)$ denote the subpixel width value of the neighboring subject pixel 751 directly above subject pixel 750 and let $W(x,y+1)$ denote the subpixel width value of the neighboring subject pixel 752 directly below subject pixel 750. If $W(x,y)<W(x,y-1)$ and $W(x,y)<W(x,y+1)$ then the values $W(x,y)$, $W(x,y-1)$ and $W(x,y+1)$ are adjusted. The adjusted width values $W_A(x,y)$, $W_A(x,y-1)$ and $W_A(x,y+1)$ are computed as follows:

$$W_A(x,y-1)=[(2/3)*W(x,y-1)]+[(1/3)*W(x,y)]$$

$$W_A(x,y)=(1/3)*[W(x,y-1)+W(x,y)+W(x,y+1)]$$

$$W_A(x,y+1)=[(2/3)*W(x,y+1)]+[(1/3)*W(x,y)]$$

Figure 17:
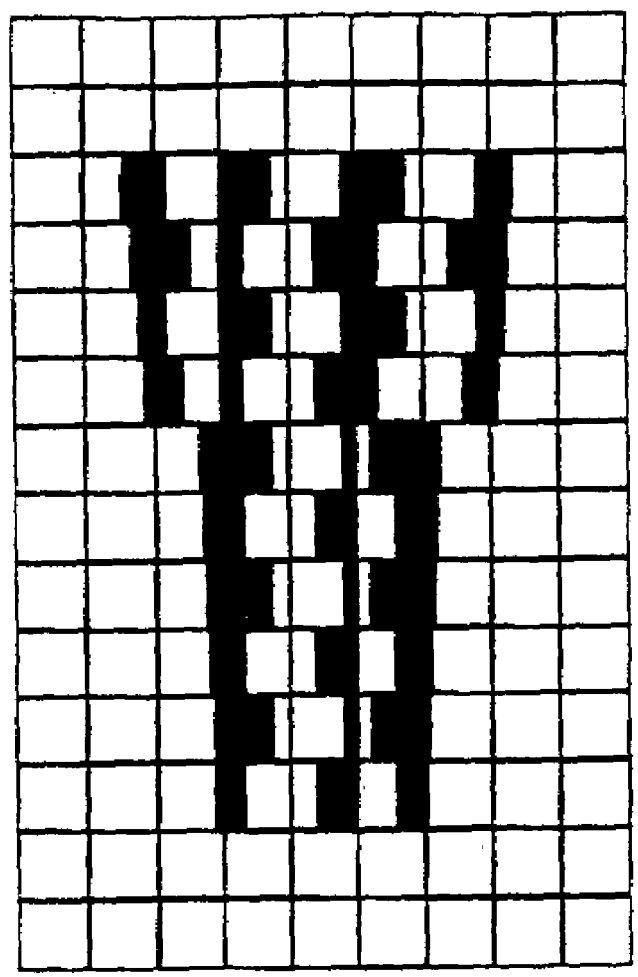
FIG. 17 shows a schematic representation of an object after subpixel position determination and vertical smoothing.

FIG. 17 shows a schematic representation of the object in FIG. 15B after subpixel position adjustment and vertical smoothing.

An alternative implementation utilizing the serial configuration shown in FIG. 12 identifies a target pixel and a second pixel as described above and performs subpixel position adjustment for target pixels only. In this implementation, vertical smoothing is not performed.

Parallel Implementation

Figure 18:
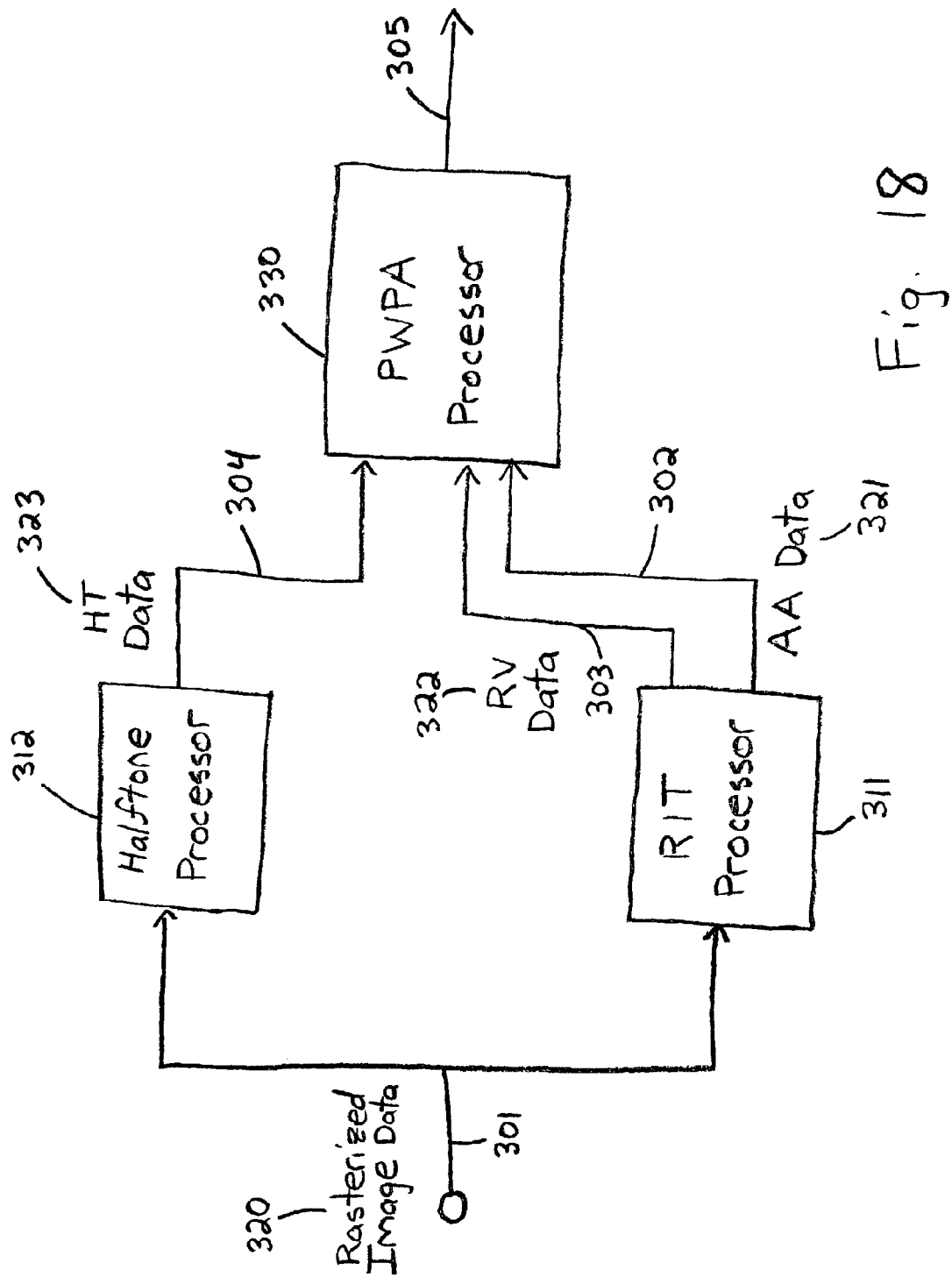
FIG. 18 is a block diagram of a system that may be used to carry out various aspects of the invention.

FIG. 18 is a block diagram of an alternative system configuration that may be used to carry out the invention. RIT processor 311 and a halftone processor 312 operating in parallel receive rasterized image data 320 from path 301. The rasterized image data 301 can be any representation of image data including RGB or CMYK data, or black and white data.

Figure 19:
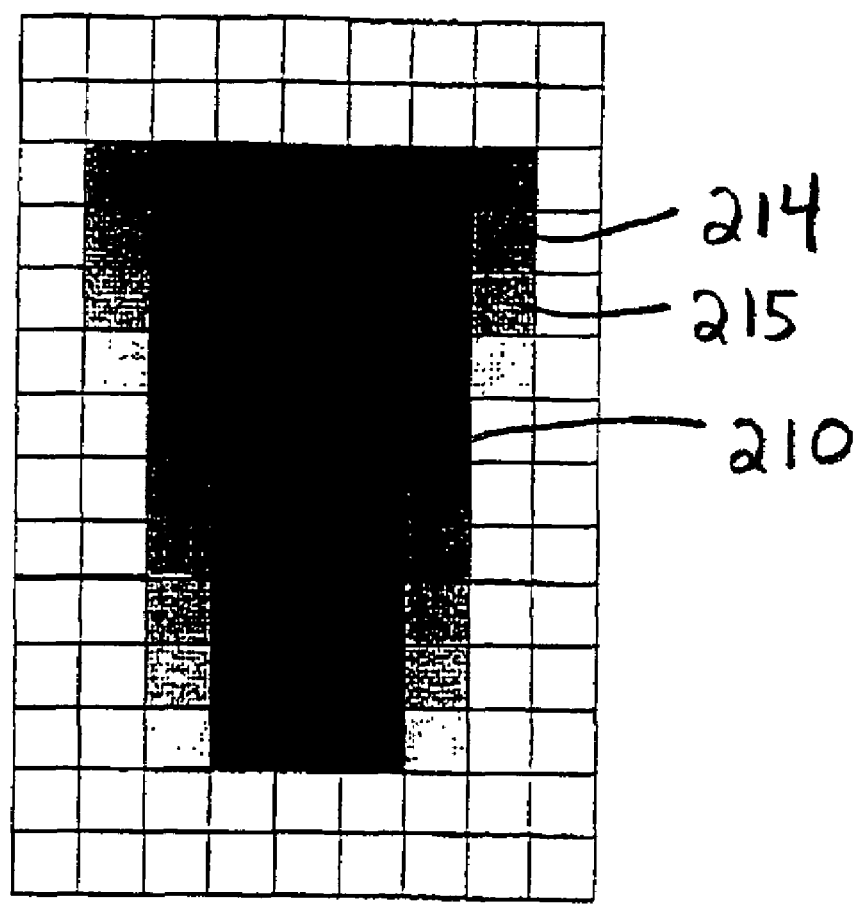
FIG. 19 shows a schematic representation of an object after antialiasing.

The RIT processor 311 performs an antialiasing operation to smooth the edges contained in the rasterized image data 320. Antialiased data 321 is generated along path 302. The antialiasing operation can be performed by means of any one of a number of known antialiasing algorithms. A preferred implementation of the invention utilizes the process described in the U.S. Patent Application entitled "Fast Text/Graphics Resolution Improvement with Chain-Code Table Look-Up" by Onur G. Guleryuz and Anoop K. Bhattachaijya, described above. The boundary of each object is traced, parameterized and smoothed. FIG. 19 shows a schematic representation of an object 210 after antialiasing. The gray levels of pixels 214, 215 at an edge of the object 210 have been adjusted to intermediate values representing both object and background.

The RIT processor 311 additionally calculates for each pixel in the rasterized image data 320 a rendition value representing the degree to which a pixel represents an object. In a preferred implementation, a pixel that is used entirely for background rendition is assigned a rendition value of 0 while a pixel used entirely for object rendition receives a rendition value of 1. A pixel that represents both background and object receives a rendition value between 0 and 1. Rendition value data 322 is generated along path 303.

Figure 20:
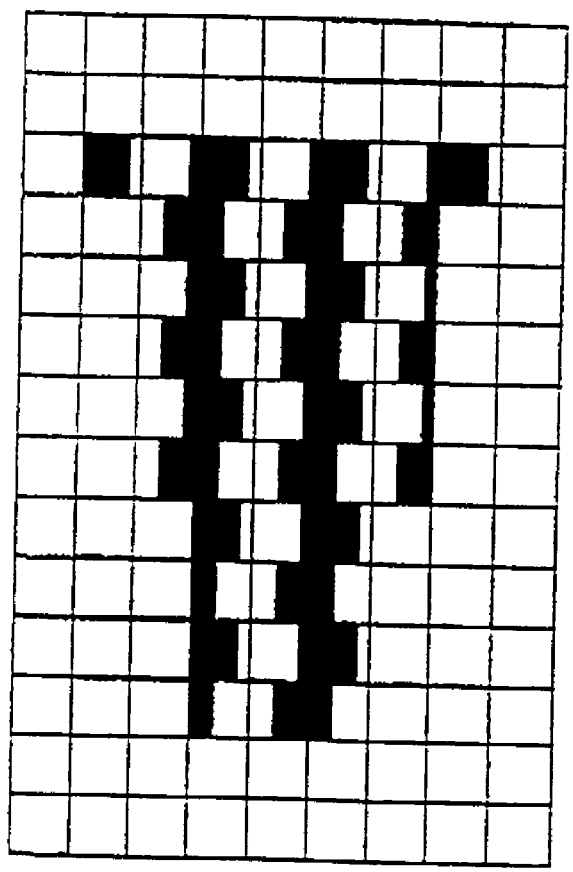
FIG. 20 shows a schematic representation of an object after halftoning.

The halftone processor 312, operating in parallel with the RIT processor 311, processes the rasterized image data 320 to produce for each pixel a halftoned intensity value representing the pixel's gray level. Halftoned data 323 comprising halftoned intensity values is generated along path 304. According to one implementation of the invention, the halftone processor 312 additionally generates initial subpixel width values and initial subpixel position values based on the halftoned intensity values. FIG. 20 shows a schematic representation of subpixels for the object in FIG. 8 after halftoning. Subpixels representing the object have been generated from halftoned intensity values.

Figure 21:
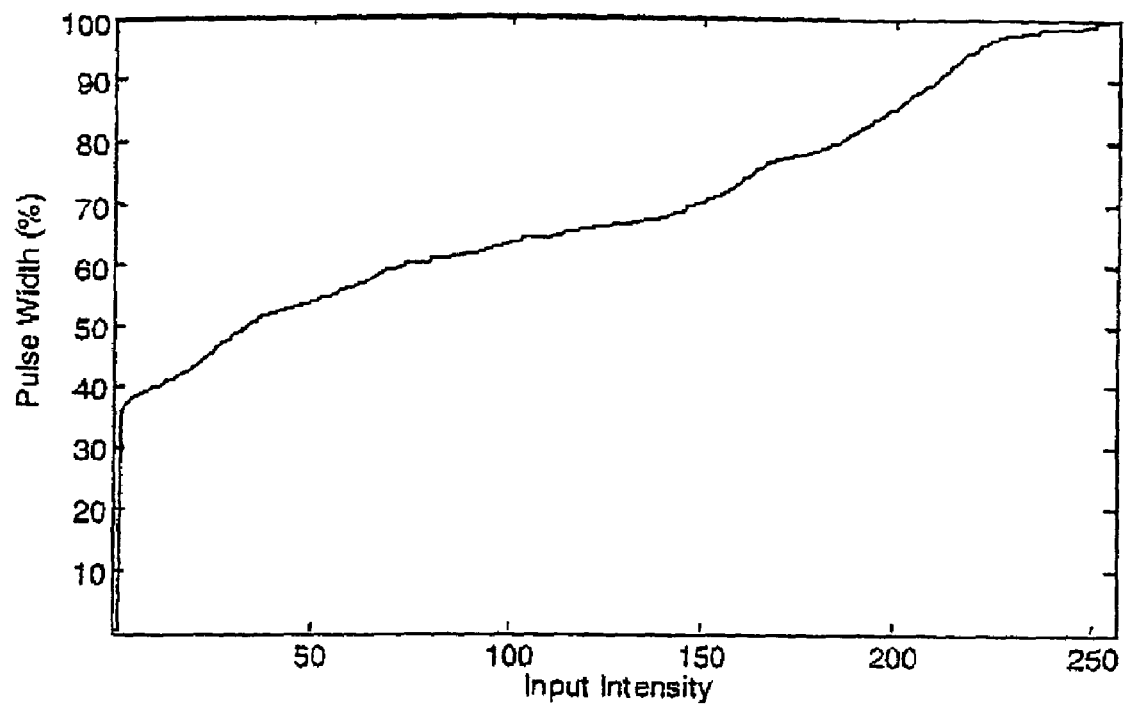
FIG. 21 is a graphical representation of one relationship between subpixel width and input intensity.

In a preferred implementation, a Pulse Width and Position Adjustment (PWPA) processor 330 examines the rendition value data 322 to identify target pixels, adjacent background pixels and adjacent second pixels. For each target pixel and adjacent second pixel, a subpixel position value is determined by the subpixel position determination process described above. A subpixel width value for each target pixel and adjacent second pixel is generated based on the respective pixel's rendition value and antialiased data 321. Preferably, subpixel width values are generated in a manner that provides gamma correction. FIG. 21 is a graphical representation of one relationship between pulse width and input intensity that provides gamma correction. The subpixel width values and subpixel position values for all pixels other than target pixels and second pixels are generated based on halftoned data 323.

In an alternative implementation of the invention, initial subpixel width values and initial subpixel position values are generated for all pixels in the image data. Subsequently, subpixel position values of target pixels and second pixels are adjusted by the subpixel position determination process described above. In this implementation, halftoned intensity values are used to generate initial subpixel width and position values for each pixel in the image. The PWPA processor 330 examines the rendition value data 322 to identify target pixels and adjacent second pixels. For each target pixel, the PWPA processor 330 generates substitute subpixel width and position values according to the process described above. The substitute subpixel width and position values are substituted for the corresponding initial subpixel width and position values generated for that pixel from the halftoned intensity values. The resulting subpixel width and position values are transmitted along path 305.

The invention claimed is:

1. A method for processing image data for presentation by a printing device of an image that depicts an object in front of a background, wherein the method comprises:
   obtaining a rendition value for a target pixel that represents the object and is adjacent to a background pixel that represents only the background, wherein the rendition value represents a degree to which the target pixel represents the object;
   determining a first position value that represents a position of a subpixel within the target pixel, wherein the determination is based on the target pixel's location with respect to a second pixel that represents the object and is adjacent to the target pixel; and
   determining a second position value that represents a position of a subpixel within the second pixel, wherein the determination is based on the second pixel's location with respect to the target pixel.

2. The method of claim 1, wherein the step of determining the second position value comprises:
   determining the second position value to represent a subpixel at a right edge of the second pixel if the target pixel is located to the right of the second pixel; and
   determining the second position value to represent a subpixel at a left edge of the second pixel if the target pixel is located to the left of the second pixel.

3. The method of claim 2, wherein the step of determining the first position value comprises:
   determining the first position value to represent a subpixel at a left edge of the target pixel if the second pixel is located to the left of the target pixel; and
   determining the first position value to represent a subpixel at a right edge of the target pixel if the second pixel is located to the right of the target pixel.

4. The method of claim 1, further comprising the steps of:
   identifying a subject pixel located on a vertical boundary between the object and its background that represents the object and is adjacent to a subject-adjacent background pixel that represents only the background; and
   adjusting a subpixel width value representing a width of a subpixel within the subject pixel and subpixel width values representing widths of subpixels within a plurality of neighboring pixels, according to a function of the subpixel width values of the subject pixel and the neighboring pixels, wherein the neighboring pixels are adjacent to the subject pixel, are located on the vertical boundary, and represent the object.

5. The method of claim 1, further comprising the steps of:
   applying a first halftoning process to the image data to produce halftone data to be used to generate the subpixel within the second pixel;
   applying an antialiasing process to the image data to produce antialiased data;
   applying a second halftoning process to the antialiased data to obtain a halftone value to be used to generate the subpixel within the target pixel; and
   calculating the rendition value based on the antialiased data.

6. The method of claim 1, further comprising the steps of:
   applying an antialiasing process to the image data to produce antialiased data;
   calculating the rendition value based on the antialiased data; and
   applying a halftoning process to the antialiased data to produce halftone data to be used to generate the subpixels within the target pixel and the second pixel.

7. An apparatus for processing image data for presentation by a printing device of an image that depicts an object in front of a background, the apparatus comprising processing circuitry that:
   obtains a rendition value for a target pixel that represents the object and is adjacent to a background pixel that represents only the background, wherein the rendition value represents a degree to which the target pixel represents the object;
   determines a first position value that represents a position of a subpixel within the target pixel, wherein the determination is based on the target pixel's location with respect to a second pixel that represents the object and is adjacent to the target pixel; and
   determines a second position value that represents a position of a subpixel within the second pixel, wherein the determination is based on the second pixel's location with respect to the target pixel.

8. The apparatus of claim 7, wherein the second position value is determined by:
   determining the second position value to represent a subpixel at a right edge of the second pixel if the target pixel is located to the right of the second pixel; and
   determining the second position value to represent a subpixel at a left edge of the second pixel if the target pixel is located to the left of the second pixel.

9. The apparatus of claim 8, wherein the first position value is determined by:
   determining the first position value to represent a subpixel at a left edge of the target pixel if the second pixel is located to the left of the target pixel; and
   determining the first position value to represent a subpixel at a right edge of the target pixel if the second pixel is located to the right of the target pixel.

10. The apparatus of claim 7, further comprising processing circuitry that:
    identifies a subject pixel located on a vertical boundary between the object and its background that represents the object and is adjacent to a background pixel that represents only the background; and
    adjusts a subpixel width value representing a width of a subpixel within the subject pixel and subpixel width values representing widths of subpixels within a plurality of neighboring pixels, according to a function of the subpixel width values of the subject pixel and the neighboring pixels, wherein the neighboring pixels are adjacent to the subject pixel, are located on the vertical boundary, and represent the object.

11. The apparatus of claim 7, further comprising processing circuitry that:
applies a first halftoning process to the image data to produce halftone data to be used to generate the subpixel within the second pixel;
applies an antialiasing process to the image data to produce antialiased data;
applies a second halftoning process to the antialiased data to obtain a halftone value to be used to generate the subpixel within the target pixel; and
calculates the rendition value based on the antialiased data.

12. The apparatus of claim 7, further comprising processing circuitry that:
applies an antialiasing process to the image data to produce antialiased data;
calculates the rendition value based on the antialiased data; and
applies a halftoning process to the antialiased data to produce halftone data to be used to generate the subpixels within the target pixel and the second pixel.

13. A computer-readable medium encoded with a computer program for implementing a method for processing image data for presentation by a printing device of an image that depicts an object in front of a background, wherein the method comprises:
obtaining a rendition value for a target pixel that represents the object and is adjacent to a background pixel that represents only the background, wherein the rendition value represents a degree to which the target pixel represents the object;
determining a first position value that represents a position of a subpixel within the target pixel, wherein the determination is based on the target pixel's location with respect to a second pixel that represents the object and is adjacent to the target pixel; and
determining a second position value that represents a position of a subpixel within the second pixel, wherein the determination is based on the second pixel's location with respect to the target pixel.

14. The computer-readable medium of claim 13, wherein the step of determining the second position value comprises:
determining the second position value to represent a subpixel at a right edge of the second pixel if the target pixel is located to the right of the second pixel; and
determining the second position value to represent a subpixel at a left edge of the second pixel if the target pixel is located to the left of the second pixel.

15. The computer-readable medium of claim 14, wherein the step of determining the first position value comprises:
determining the first position value to represent a subpixel at a left edge of the target pixel if the second pixel is located to the left of the target pixel; and
determining the first position value to represent a subpixel at a right edge of the target pixel if the second pixel is located to the right of the target pixel.

16. The computer-readable medium of claim 13, wherein the method further comprises the steps of:
identifying a subject pixel located on a vertical boundary between the object and its background that represents the object and is adjacent to a subject-adjacent background pixel that represents only the background; and
adjusting a subpixel width value representing a width of a subpixel within the subject pixel and subpixel width values representing widths of subpixels within a plurality of neighboring pixels, according to a function of the subpixel width values of the subject pixel and the neighboring pixels, wherein the neighboring pixels are adjacent to the subject pixel, are located on the vertical boundary, and represent the object.

17. The computer-readable medium of claim 13, wherein the method further comprises the steps of:
applying a first halftoning process to the image data to produce halftone data to be used to generate the subpixel within the second pixel;
applying an antialiasing process to the image data to produce antialiased data;
applying a second halftoning process to the antialiased data to obtain a halftone value to be used to generate the subpixel within the target pixel; and
calculating the rendition value based on the antialiased data.

18. The computer-readable medium of claim 13, wherein the method further comprises the steps of:
applying an antialiasing process to the image data to produce antialiased data;
calculating the rendition value based on the antialiased data; and
applying a halftoning process to the antialiased data to produce halftone data to be used to generate the subpixels within the target pixel and the second pixel.

19. An apparatus for processing image data for presentation by a printing device of an image that depicts an object in front of a background, wherein the apparatus comprises:
means for obtaining a rendition value for a target pixel that represents the object and is adjacent to a background pixel that represents only the background, wherein the rendition value represents a degree to which the target pixel represents the object;
means for determining a first position value that represents a position of subpixel within the target pixel, wherein the determination is based on the target pixel's location with respect to a second pixel that represents the object and is adjacent to the target pixel; and
means for determining a second position value that represents a position of a subpixel within the second pixel, wherein the determination is based on the second pixel's location with respect to the target pixel.

20. The apparatus of claim 19, wherein the means for determining the second position value comprises:
means for determining the second position value to represent a subpixel at a right edge of the second pixel if the target pixel is located to the right of the second pixel; and
means for determining the second position value to represent a subpixel at a left edge of the second pixel if the target pixel is located to the left of the second pixel.

21. The apparatus of claim 20, wherein the means for determining the first position value comprises:
means for determining the first position value to represent a subpixel at a left edge of the target pixel if the second pixel is located to the left of the target pixel; and
means for determining the first position value to represent a subpixel at a right edge of the target pixel if the second pixel is located to the right of the target pixel.

22. The apparatus of claim 19, further comprising:
means for identifying a subject pixel located on a vertical boundary between the object and its background that represents the object and is adjacent to a subject-adjacent background pixel that represents only the background; and means for adjusting a subpixel width value representing a width of a subpixel within the subject pixel and subpixel width values representing widths of subpixels within a plurality of neighboring pixels, according to a function of the subpixel width values of the subject pixel and the neighboring pixels, wherein the neighboring pixels are adjacent to the subject pixel, are located on the vertical boundary, and represent the object.

23. The apparatus of claim 19, further comprising:

means for applying a first halftoning process to the image data to produce halftone data to be used to generate the subpixel within the second pixel;

means for applying an antialiasing process to the image data to produce antialiased data;

means for applying a second halftoning process to the antialiased data to obtain a halftone value to be used to generate the subpixel within the target pixel; and means for calculating the rendition value based on the antialiased data.

24. The apparatus of claim 19, further comprising:

means for applying an antialiasing process to the image data to produce antialiased data;

means for calculating the rendition value based on the antialiased data; and means for applying a halftoning process to the antialiased data to produce halftone data to be used to generate the subpixels within the target pixel and the second pixel.

* * * * *

UNITED STATES PATENT AND TRADEMARK OFFICE
CERTIFICATE OF CORRECTION

PATENT NO. : 7,265,876 B2  Page 1 of 1
APPLICATION NO. : 10/143617
DATED : September 4, 2007
INVENTOR(S) : Jincheng Huang et al.

It is certified that error appears in the above-identified patent and that said Letters Patent is hereby corrected as shown below:

Column 12, line 64, change "adjacent to a background pixel" to -- adjacent to a subject-adjacent background pixel --

Signed and Sealed this

Third Day of June, 2008

JON W. DUDAS
*Director of the United States Patent and Trademark Office*